United States Patent [19]

Louis

[11] Patent Number: 4,719,455

[45] Date of Patent: Jan. 12, 1988

[54] INTEGRATING POINTING DEVICE

[76] Inventor: William M. Louis, 543 Cerro St., Encinitas, Calif. 92024

[21] Appl. No.: 821,962

[22] Filed: Jan. 24, 1986

[51] Int. Cl.⁴ .............................................. G09G 1/00
[52] U.S. Cl. .................................. 340/709; 200/5 A; 200/18
[58] Field of Search .............. 340/710, 709; 200/5 R, 200/5 A, 18

[56]  References Cited

U.S. PATENT DOCUMENTS 4,652,704  3/1987  Franklin ............................. 200/5 A
4,654,647  3/1987  Wedam ............................... 340/709

Primary Examiner—Howard A. Birmiel
Attorney, Agent, or Firm—Brown, Martin, Haller & Meador

[57] ABSTRACT

A pointing and control device for moving a cursor on a visual display and for controlling various operations, being operated by hand and finger movements, including both fine movement control and gross movement control; the assembly includes a graspable outer cover and an inner puck with a finger cup movably supported by a series of elements, a laser beam movement detector consisting of high and low frequency scanners, drivers, lower and upper photodetectors and signal amplifiers and processors. The entire assembly may be either fixed on a keyboard or operated as an independent accessory.

16 Claims, 5 Drawing Figures

4,719,455

INTEGRATING POINTING DEVICE

FIELD OF THE INVENTION

This invention relates to pointing and position control devices for moving a cursor on a visual display and for controlling various operations such as selecting functions from a menu, positioning and designing graphics.

This invention more specifically relates to a pointing or control device, which integrates coarse and fine control movements and which is hand and finger operated.

BACKGROUND OF THE INVENTION

Several types of pointing devices are in use in information display systems. The devices of the prior art are represented by Laman, U.S. Pat. No. 3,269,190; Gersten, U.S. Pat. No. 3,395,589; Brown et al, U.S. Pat. No. 3,643,148; Rider, U.S. Pat. No. 3,835,464; Opocensky, U.S. Pat. No. 3,987,685; Thornburg, U.S. Pat. No. 4,313,113; and Alexander, U.S. Pat. No. 3,013,441.

Other positioning devices in current use in computer control systems are popularly known as: a mouse, a touch screen, cursor keys, a digitized pad with an electronic pen, a light pen, a joystick and a trackball.

A specific limitation of many of the devices of the prior art and the popularly marketed devices is that the degree of precision control available is crude compared to the power and precision of the data processing devices themselves and detection of fine movements of the imput devices are a particular limitation. Another reason for the lack of precision is that the devices are difficult to control because they do not conform to the user's ordinary motor skills and capabilities of the human musculature.

This invention seeks to provide greater precision and to conform more closely to the operator's motor skills developed over his lifetime. Largely control of drawing and pointing operations is developed through eye-hand coordination and feedback in the common tasks of drawing and writing with pen and paper. These same arm, hand and finger movements are captured as input by the present invention and reflected on a computer screen to provide visual feedback, simulating the eye-hand coordination of writing operations. The present device provides two-level control. First, gross movement input from arm muscle action is transmitted through the thumb and middle finger grasping the outer cover of the pointing device which moves throughout a detectable range relative to the fixed base. Second, fine detail is controlled by the index finger resting on a small cup that glides easily along a spherical surface approximating the natural path of the finger tip as it pivots on its joints.

Other control movements may also be incorporated in the design of the control device. For example, a switching action can be provided by downward pressure on the finger cup by the index finger. This is analogous to pressing a writing implement against paper to leave a mark or continuous line or to vary the width of a line.

The device integrates these three input movements allowing the operator to utilize, in his discretion, the same skills developed with pencils and pens but with the hand remaining in substantially the same place on the device. Since the device is symmetrical, it can be operated from either hand.

An objective being a multi-purpose control device, it can be seen that the cited references and devices now marketed are functionally limited in that they either require considerable flat surface area for movement such as with a mouse. Some require taking one hand off of the regular control devices such as the keyboard. All have a low resolution capability. There is thus a need for a pointing device which is at once capable of broad and fine detail that does not require large surface area for operation, can be conveniently keyboard mounted and combines accuracy, convenience and low cost.

SUMMARY OF THE INVENTION

The principal object of the invention is to provide a pointing device for accurately moving a cursor on a visual display.

Another object of the invention is to provide a control device for controlling various operations of the associated circuitry, such as selecting functions from a menu, positioning and designing graphics.

It is still another object of the invention to provide coarse movement control of the cursor in relation to the hand movement.

A further object of the invention is to provide fine detailed control of the cursor.

Another object of the invention is to provide a multipurpose control unit for mechanical devices such as vehicles that will improve precision over those now available.

DESCRIPTION OF THE PREFERRED EMBODIMENT OF THE INVENTION

Figures 1, 2, 3, 4:
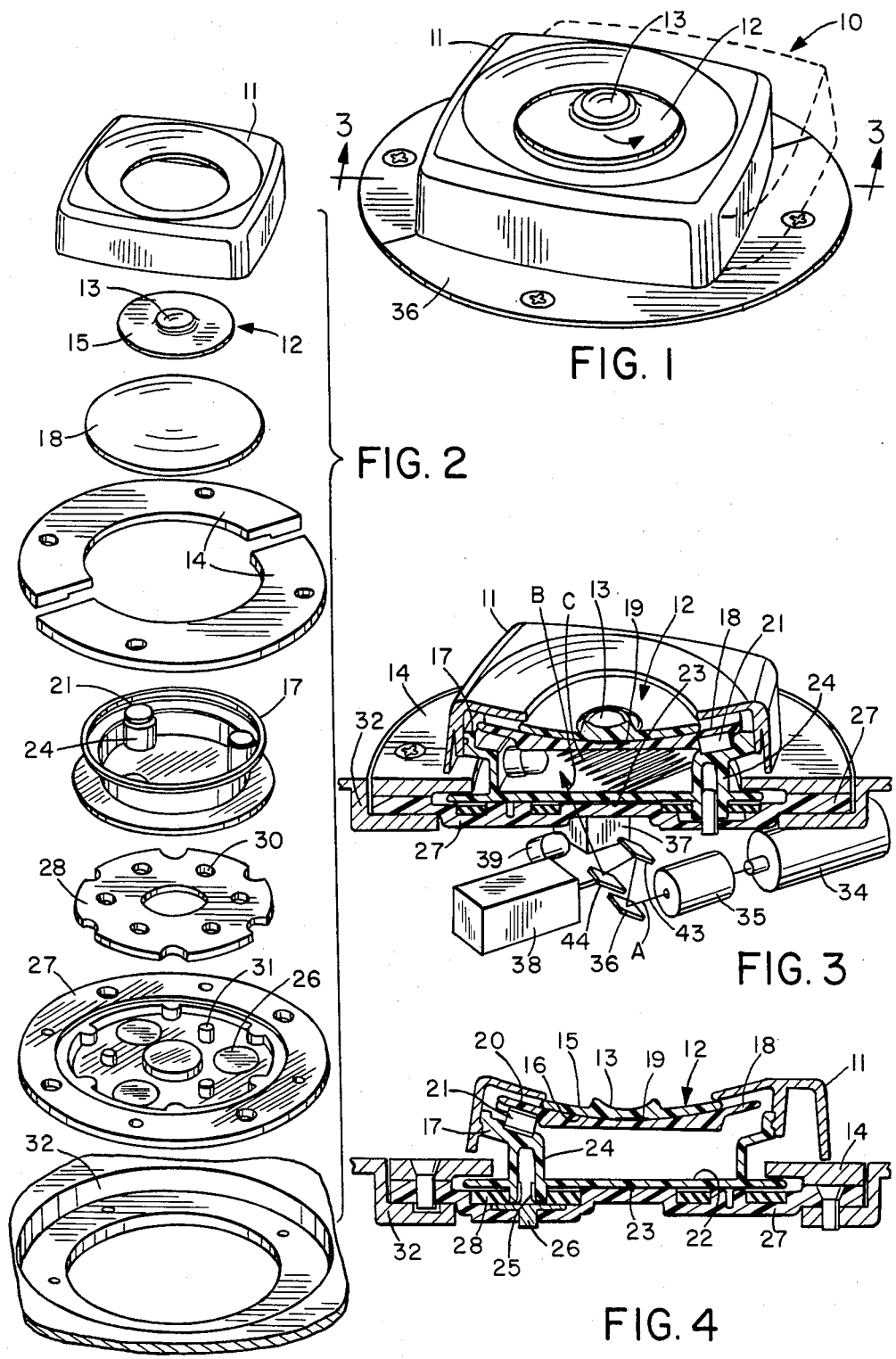
FIG. 1 is a perspective view of the preferred embodiment of the invention.
FIG. 2 is a detailed exploded view of the mechanical parts of the invention.
FIG. 3 is a perspective view of the cross-section of the invention along section line 3—3 in FIG. 1.
FIG. 4 is a side view of the cross-section of the invention approximately along line 3—3 in FIG. 1.

FIG. 1 is a perspective view of the external design of the pointing device and including a moveable cover 11 a circular moveable puck 12 containing a finger cup 13, the entire construction mounted on two "C" retainers 14.

The design allows for at least three types of movement with coarse and fine control in one plane. The first movement is the X and Y gross horizontal movement of the cover 11 as will be later explained and as shown in phantom lines in FIG. 1. The second is the fine fingertip control movements of the puck 12 controlled by an index finger resting in the cup 13 and moving in a generally X-Y plane and the third is downward movement of the puck 12 or Z-axis movement caused by increasing pressure of fingertip in the cup 13.

These three movements are integrated to simulate the natural use of the hand and arm. In writing for example, one forms individual letters by finger action and moves from letter or groups of letters in gross arm-directed-jumps. Some patterns involve simultaneous action of fingers and arm. For example, making a raster-like pattern when the fingers direct a continuous rapid up-anddown motion, while the wrist makes steady horizontal movement.

Likewise, when using the pointing device 10, the arm moves the cover 11, which would direct the cursor or indicator in a gross movement toward the desired point on the visual display or screen.

As the desired point is approached the finger moves the puck 12, which would accurately position the cursor on the screen. This requires the coordinated finger muscles, which are used in writing and sketching, to guide the puck 12.

Once the cursor is positioned, there remains to select and control various functions or operations. This is accomplished by downward finger pressure on the finger cup 13.

This finger pressure is translated into either an ON-OFF function or an analog response that could be used to vary the width or density of the lines as with pressing on a pencil.

Other controlling movements of the elements of the device or additional buttons or switches placed around the perimeter of the device can add convenient functional capabilities.

FIG. 2 is an exploded view illustrating the various mechanical elements of the pointing device 10.

FIG. 4 is a cross-sectional view of the pointing device 10, illustrating the same elements shown in FIG. 2 as assembled. FIGS. 2 and 4 will henceforth be simultaneously referred to in the following description.

The movable cover 11 is opaque and screws onto the bridge 17. The relative placement and movements of these devices will be shown on the next view. The puck 12 comprises a finger cup 13 to receive the user's index fingertip. The cup 13 is surrounded by a curved circular surface area 15.

The bottom surface 16 of the puck 12 is slightly convex and rests on a bowl 18. As will be explained below, the bottom surface 16 is opaque and dark, except for a reflective circular target 19 in the center, to provide a reflective surface for the optical detection device. The puck 12 is made out of material having a low coefficient of friction, in order to minimize the movement resistance between the puck 12 and the bowl 18.

The bowl 18, is optically clear to allow passage of the laser beam or operation of other optical detection devices. The upper part 20 of the bowl 18 is concave and supports puck 12 and has the same spherical curvature as the bottom surface 16 of the puck 12.

The movement of the slightly convex bottom surface 16 of the puck 12, within the cavity formed by the support elements is restrained to a semi-spherical path by the concave upper part 20 of the bowl 18. This movement corresponds to the natural arcuate range of motion of the finger tip moving the cup 13, without requiring the repositioning of the hand. Such ergonomic design provides convenience and reduced fatigue to the user during long periods of manipulation.

The bowl 18 also carries the downward pressure on the finger cup 13, and compresses the three pressure-compliant resistors 21 or other type of pressure transducer on which it rests. The resistance of the resistors 21 varies with the exerted pressures. The resistors 21 are housed within the bridge 17.

The bridge 17 is optically clear. It supports the bowl 18, screws to the cover 11, and moves horizontally therewith. The bottom part 22 of the bridge 17 has a reflective target point 23 in its center to reflect the laser beam.

The bridge 17 rests on three feet 24 (illustrated in FIG. 4) with sliders 25 that support and make electrical contact with three conductors 26 on the support plate 27 through an elastic doughnut 28. The bridge 17 also houses the upper photodetector 29 (as shown in FIG. 3, but not shown in FIGS. 2 and 4).

The elastic doughnut 28 lies within the support plate 27 and has six holes 30 equidistally located around the center of the doughnut 28. The three bridge feet 24 and sliders 25 fit in three holes 30. The remaining three holes 30 alternate with the bridge feet 24 and accommodate the three bosses 31 of the support plate 27.

The elastic doughnut 28 is distorted by the movement of the bridge feet 24, and its rigidity or plasticity is selected to give suitable center force to movements of the cover 11. It may be porous with open cells.

The support 27 is optically clear to allow the laser beam to pass through. It rests in the case hole 32 to which it is attached. It is not usually "user removable", but could be easily removed for maintenance and servicing. It makes a liquid-tight seal in the case hole 32 so that all the electrical components below remain protected.

The support 27 comprises the three conductors 26, which as described above, make an electrical contact with the sliders 25.

Two "C" retainers 14 restrain the bridge 17 on the support plate 27, and also screw to the support plate 27. The retainers 14 are opaque and are split so as to enable the assembly and disassembly of the bridge 14.

The case hole 32 is located on the key board of the computer. If the device 10 is to be used separately, the case hole 32 could be part of a separate housing.

FIG. 3 illustrates the physical representations of the optical and electrical components of the device 10, which comprise a laser beam generator (laser) 34, optical lenses 35, a fixed mirror 36, a high-frequency scanner 37, a low-frequency scaner 38, a lower photodetector 39, an upper photodetector 29, and two signal amplifiers 40.

Figure 5:
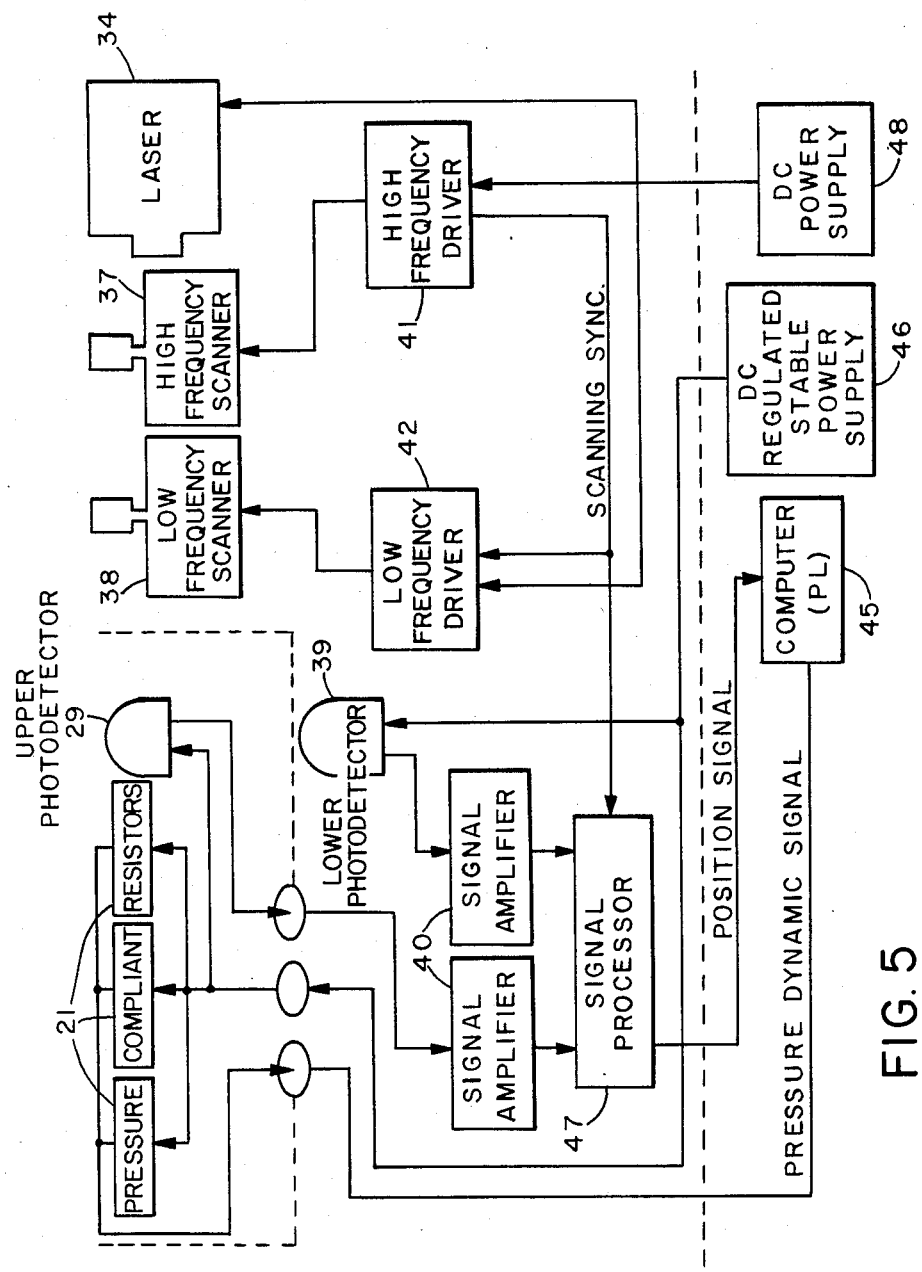
FIG. 5 is a block diagram for the optical and electrical circuitry.

FIG. 5 illustrates the same components shown in FIG. 3 in a block diagram, and refers thereto by the same part number. FIGS. 3 and 5 will henceforth be simultaneously referred to in the following description.

Starting within the laser 34, a laser beam A is directed through the optical lenses 35 which focus or condense the beam A to a narrower width.

The fixed mirror 36 (FIG. 3) then reflects the beam A to a high-frequency scanner 37, which in turn reflects the beam A to a low-frequency scanner 38.

The high-frequency scanner 37 comprises a high-frequency driver 41 (FIG. 5) and a high-speed oscillating mirror 43 (FIG. 3). Similarly, the low-frequency scanner 38 comprises a low-frequency driver 42 (FIG. 5) and a low-speed oscillating mirror 44 (FIG. 3). Both mirrors 43 and 44 (FIG. 3) oscillate around their respective axes in a horizontal plane at 90 degrees to each other.

The reflection of the laser beam A upon the scanners 37 and 38 directs scanning beam B which generates a raster pattern C (FIG. 3) on surfaces which it intercepts.

As specifically shown in FIG. 3, the directed scanning beam B passes through the optically clear support plate 27 and is either reflected back by the target point 23 so that some of the light is detected by the lower photodetector 39 or the beam continues through the bridge 17 and the bowl 18 and hits the bottom of the puck 12 where it may either be absorbed by the dark surface or be reflected by the circular target 19 so that some of the light is detected by the upper photodetector 29.

The shape of both targets 19 and 23 is so designed as to prevent the lower reflective point target 23 from obscuring the upper reflective puck target 19. The puck target 19 could optionally be a cross, a circle or some other shape so as not to be totally obstructed by the point target 23.

Whenever the scanning beam B intercepts the two-dimensional or circular target 19 (FIG. 3), it reflects into a scatter light which is detected by the upper photodetector 29, which inputs an electrical signal to a signal amplifier 40 (FIG. 5). The amplifier 40 in turn inputs an amplified signal to the signal processor 47.

Similarly, whenever the scanning beam B intercepts the target point 23, it reflects into a scatter light which is detected by the lower photodetector 39, which outputs an electrical signal to a signal amplifier 40. The amplifier 40 in turn inputs an amplified signal to the signal processor 47 (FIG. 5).

Both the upper and lower photodetectors 29 and 39 do not directly detect the position of the cover 11 or puck 12. They only detect the existence or absence of scatter light which may be used to determine the positions of the optical targets on the cover and puck 11 and 12.

In every complete raster scan, there will be scatter light generated, first from the puck or circular target 19, and second from the bridge or point target 23. The signal processor 47 (FIG. 5) will receive data associated with the reflected light from both the upper photodetector 29 and lower photodetector 39 and is programmed to differentiate between the puck-reflected light and the bridge-reflected light.

When the puck 12 is moved, the puck target 19 moves, and the scanning beam C is reflected into diffuse light. The signal processor 47 receives the electrical signal generated by the upper photodetector 29 detecting the reflected light. The signal processor 47 is also continuously receiving signals from both the low-frequency driver 42 and high-frequency driver 41 which taken together with programmed information allow it to determine the position of the scanning beam C in raster pattern when it receives a signal from the upper photodetector. Thus the microprocessor 45 (FIG. 5) is able to compute the location of the puck target 19 and hence the puck 12 by piecing together the pattern of positions in the raster that generates scatter light. The detail of this pattern will of course be determined by the raster generated, the finer the pattern the more precise the puck may be located.

Similarly, when the cover 11 is moved, the bridge target 23 moves too, and the scanning beam C is reflected at different places in its raster pattern. Note that this pattern is not the same as mentioned above, but smaller because it is closer to its generating source. The same procedure as with the location of the puck 12 is used to locate the cover but with lower photodetector 39 as the means of detection and signal generation.

The cover 11 is diamond-shaped so that it fits the orientation of the thumb and middle fingers when grabbing it, both for right- and left-hand users. This shape gives secure grip and orientation. The size of the cover 11 is convenient for holding.

The cursor in the present invention is moved across the screen in a speedy and accurate way, by an integrated signal combining gross movement of the cover 11 and fine movement of the puck 12. By comparison, devices of the prior art including key controls and mouse-type controls either move in slow incremental manner or in gross fashion only.

The function or operation selection process, on the other hand, is distinct from the optical mechanism. Such process is simply accomplished by downward finger pressure on the finger cup 13.

The signal resulting from the pressure on the finger cup 13 could be interpreted by the computer 45 according to the programmed function sought by the user. The signal could, for example, be interpreted as a simple ON-OFF switch. In the alternative, the computer 45 could interpret the magnitude of the pressure on the finger cup 13 as graphic commands.

As detailed in FIG. 4 above, the puck 12 rests on the bowl 18 which in turn rests on the three resistors 21. A downward pressure on the finger cup 13 is transmitted to the resistors 21. As the magnitude of the pressure increases, the resistance of the resistors 21 decreases, and consequently a larger current is conducted thereby.

Such change or increase in current is translated by the computer 45 into various functions. The functions could be to thicken the width of the graphics, or darken the impression or color of the graphics, or change colors along a continuum of color spectrum.

Although the principal application of this device as discussed is its utility in computer technology, the device can also be used as a control and input device in many other applications such as control of vehicles and any other application that has traditionally used a "joystick", lever, or thumbwheel controls. Further the laser system detection and signal generation means described herein could easily be replaced or supplemented with other electronic and mechanical detection and signal generation devices which may in some cases be preferable.

While the preferred embodiment of the invention has been described and modifications have been suggested, it should be understood that other embodiments could be devised based on the same principle of operation, which would remain within the spirit of the invention and the scope of the appended claims.

What is claimed is:

1. A hand-operated pointing and control device comprising:
   a cover having an aperture, said cover of suitable size and shape to be grasped by the human hand and said cover movable relative to a fixed supporting base;
   a puck movable within said aperture and having upper and lower surfaces, said puck having on its upper surface means for retaining contact with one or more fingertips of the user's hand;
   means for detecting the location and displacement of the cover and puck; and
   means for generating an electrical signal corresponding to the detected displacement of the cover and puck.

2. The device of claim 1, wherein the finger retaining means comprises a finger cup shaped and dimensioned to receive a finger tip.

3. The device of claim 2, comprising means for constraining the puck to a concave semi-spherical range of motion corresponding to the natural range of motion of the user's finger.

4. The device of claim 1, further comprising:

means for enabling and sensing vertical movement of the puck responding to finger pressure comprising a bowl directly beneath the puck and supporting the puck;

a bridge shaped and dimensioned to receive the bowl and having upper and lower surfaces; and at least one pressure transducer located inside the bridge, said transducer being positioned to generate an electrical signal corresponding to vertically applied pressure.

5. The device of claim 4, wherein the means for supporting comprises:

a support plate, having at least one electrical conductor;

an elastic doughnut which supports the bridge and which fits within the support plate, and having holes dimensioned to receive said pressure transducer; and said conductors being located beneath the holes.

6. The device of claim 5, which further comprises means for retaining the bridge on the support plate.

7. The device of claim 6, wherein said means for retaining comprises two C-shaped retainers.

8. The device of claim 1, wherein the means for sensing location and displacement of the cover and puck comprises:

means for generating a condensed light;

means for transforming said condensed light into a raster pattern scanning beam; and means for detecting reflection of said scanning beam from optical targets placed upon the moving parts.

9. The device of claim 8, wherein said means for generating the condensed light comprises:

a laser generator for generating a laser beam; and at least one optical lens shaped and positioned to condense said laser beam.

10. The device of claim 9, further comprising:

a fixed mirror;

a high-frequency scanner;

a low-frequency scanner positioned within the reflecting field of the high-frequency scanner; and means for causing the fixed mirror to reflect said condensed laser beam to the high-frequency scanner.

11. The device of claim 10, wherein said high-frequency scanner comprises a first mirror and a high-frequency means for oscillating said first mirror.

12. The device of claim 11, wherein said low-frequency scanner comprises a mirror, and a low-frequency means for oscillating said second mirror.

13. The device of claim 12, wherein said lower surface of the puck comprises a reflective two-dimensional target.

14. The device of claim 13, wherein said bottom part of the bridge comprises a reflective target point.

15. The device of claim 13, wherein the means for detecting comprises:

a signal processor;

an upper photodetector for detecting the scatter light reflected by the reflective two-dimensional target, and which feeds the data to the signal processor;

a lower photodetector for detecting the beam reflected by the reflective target point, and which feeds the data to the signal processor; and wherein the signal processor is programmed to interpret the data from the upper and lower photodetectors, and to distinguish between their reflected beams therefrom.

16. The device claimed in claim 14, wherein the cover, the C-shaped retainers, the puck, and the elastic doughnut are opaque; and the bowl, the bridge and the support plate are optically clear.

* * * * *